(12) United States Patent
Ueda et al.

(10) Patent No.: US 7,538,965 B2
(45) Date of Patent: May 26, 2009

(54) METHOD AND APPARATUS FOR WRITING SERVO MANAGEMENT INFORMATION IN A DISK DRIVE

(75) Inventors: Katsuki Ueda, Ome (JP); Yuichi Notake, Tokyo (JP); Masahide Yatsu, Akishima (JP); Hideo Sado, Ome (JP); Seiji Mizukoshi, Nishitama-gun (JP); Takuji Shimada, Ome (JP); Takayuki Matsuzaki, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/819,407

(22) Filed: Jun. 27, 2007

(65) Prior Publication Data

US 2008/0002278 A1 Jan. 3, 2008

(30) Foreign Application Priority Data

Jun. 30, 2006 (JP) .............................. 2006-182051

(51) Int. Cl.
*G11B 21/02* (2006.01)
*G11B 5/09* (2006.01)
*G11B 5/596* (2006.01)

(52) U.S. Cl. ...................... 360/75; 360/49; 360/77.08

(58) Field of Classification Search ....................... None
See application file for complete search history.

(56) References Cited

U.S. PATENT DOCUMENTS

| 4,472,750 | A | * | 9/1984 | Klumpp et al. | ........... 360/78.01 |
| 4,490,756 | A | * | 12/1984 | Dost et al. | ................ 360/77.11 |
| 4,977,472 | A | * | 12/1990 | Volz et al. | ................. 360/78.14 |
| 5,274,510 | A | * | 12/1993 | Sugita et al. | .................... 360/49 |
| 6,049,438 | A | * | 4/2000 | Serrano et al. | .................. 360/49 |
| 6,433,948 | B1 | | 8/2002 | Lee | |
| 6,462,898 | B2 | * | 10/2002 | Blaum et al. | .............. 360/77.08 |
| 7,333,290 | B1 | * | 2/2008 | Kupferman | ............... 360/77.08 |
| 7,349,167 | B2 | * | 3/2008 | Erden et al. | .................... 360/29 |

FOREIGN PATENT DOCUMENTS

| JP | 2002-516449 | 6/2002 |
| JP | 2003-045132 | 2/2003 |

* cited by examiner

*Primary Examiner*—K. Wong
(74) *Attorney, Agent, or Firm*—Pillsbury Winthrop Shaw Pittman, LLP

(57) ABSTRACT

According to one embodiment, in a disk drive having a disk medium on which servo data is recorded, servo-write management information is recorded on the disk medium, in the form of binary data based on the 0 or 180 degrees out of phase pattern composed of the servo burst signals included in the servo data and being out of phase. The disk drive includes a servo-data reproducing unit that reproduces the servo-data and the servo-write management information.

4 Claims, 8 Drawing Sheets

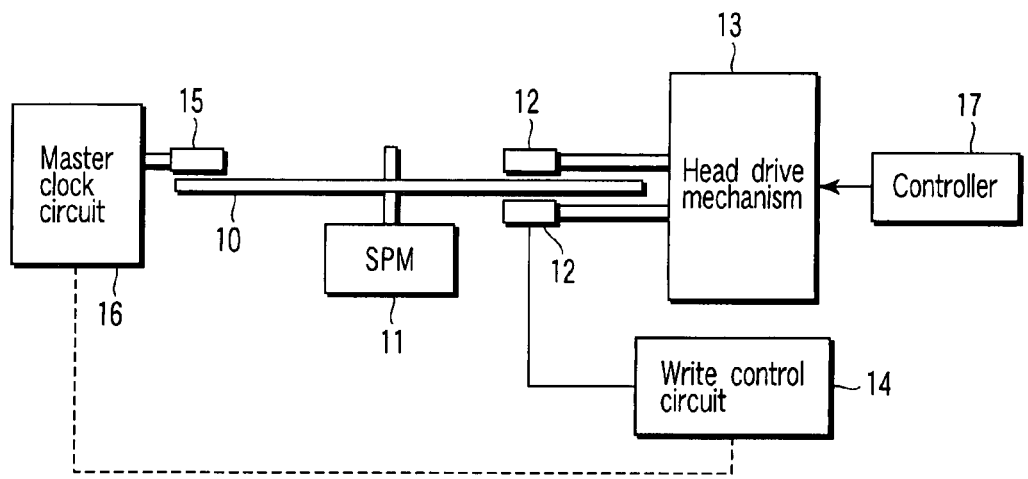
F I G. 1
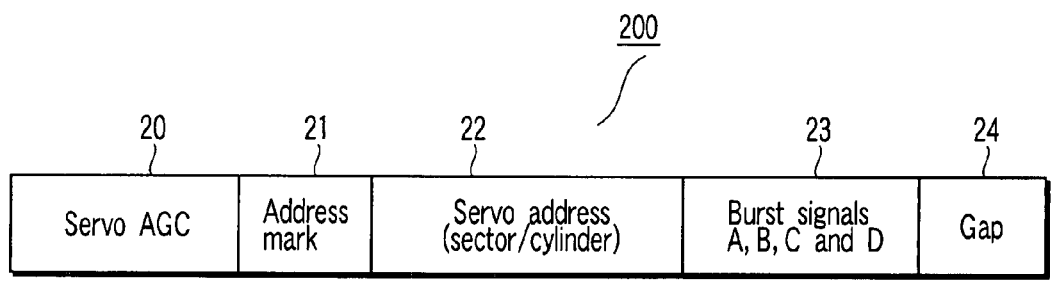
F I G. 2

| $A_{n+1}$ | $B_n$ | $A_n$ | $B_{n-1}$ | $(A, B)Track_n$ |
|---|---|---|---|---|
| * | + | + | + | 1 |
| * | + | + | - | ? |
| + | + | + | * | 1 |
| - | + | + | * | ? |
| * | - | + | + | ? |
| * | - | + | - | 0 |
| + | - | + | * | 0 |
| - | - | + | * | ? |

FIG. 7

| $C_{n+1}$ | $D_n$ | $C_n$ | $D_{n-1}$ | $(C, D)Track_n$ | $(C, D)Track_{n+1}$ |
|---|---|---|---|---|---|
| * | + | + | + | 1 | |
| * | + | + | - | ? | |
| * | - | + | + | ? | |
| * | - | + | - | 0 | |
| + | + | + | * | | + |
| - | + | + | * | | ? |
| + | - | + | * | | 0 |
| - | - | + | * | | ? |

FIG. 8

METHOD AND APPARATUS FOR WRITING SERVO MANAGEMENT INFORMATION IN A DISK DRIVE

CROSS-REFERENCE TO RELATED APPLICATIONS

This application is based upon and claims the benefit of priority from Japanese Patent Application No. 2006-182051, filed Jun. 30, 2006, the entire contents of which are incorporated herein by reference.

BACKGROUND

1. Field

One embodiment of the present invention relates to a disk drive that uses a disk medium on which servo data and servo management data are recorded.

2. Description of the Related Art

In most disk drives, a representative example of which is a hard disk drive, the positioning of the heads is controlled in accordance with the servo data (servo pattern) that is recorded on a disk-shaped medium (disk medium), i.e., a data-recording medium. That is, the heads are moved to target positions (i.e., target tracks or target cylinders) on the disk medium, in accordance with the servo data the heads have read.

The servo data has been recorded on the disk medium in the servo-writing step performed in manufacturing the disk drive. In the servo-writing step, an apparatus called servo-track writer (STW) writes the servo data on the disk media before or after the disks are incorporated into the disk drive.

In the step of writing servo data on a disk medium, writing errors may be generated. In such a case, the STW keeps writing the servo data if the errors fall within a tolerable range. The STW generates information (hereinafter referred to as "servo-write management information") about the writing errors and the parts of the medium where the writing errors have occurred. The STW writes the servo-write management information on the disk medium. This information is defect information that contains data items representing the parts of the medium where the writing errors have occurred and data items representing the other parts of the medium on which data may be written instead. In most cases, these data items are address codes of the servo sectors and servo tracks.

The servo-write management information is useful in inspecting the troubles the disk drive after the disk drive has been shipped. A system has been proposed, in which the servo-write management information (STW management information) is recorded in the sector-number area (i.e., sector-address area) in which to write the servo data. (See, for example, Jpn. Pat. Appln. KOKAI Publication No. 2003-45132.) In this system, however, the sector-number area increases in proportion to the number of servo sectors in which servo-write management is recorded.

A system has been proposed, in which the servo burst signals (i.e., servo burst patterns) contained in the servo data are used to save the storage area of the servo sectors. (See, for example, Jpn. Pat. Appln. KOKAI Publication No. 2002-516449.) In this system, however, no measures are taken in connection with the recording of servo-write management information. An increase in the storage area of servo sectors cannot be suppressed at all.

If the servo-write management information is recorded on the disk medium, together with the servo data, it will indeed help to inspect the disk drive in the event of errors. However, increasing number of servo data, in which the servo-write management information is buried will be one of the factors that prevent an increase in the density in which the user data is recorded.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the major components of a servo-track writer according to an embodiment of the present invention;

FIG. 2 is a diagram explaining the format of servo data according to the embodiment;

FIG. 7 is a table explaining the relation between the phases of servo burst signals A and B and bit values, which is observed in the embodiment;

FIG. 8 is a table explaining the relation between the phases of servo burst signals C and D and bit values, which is observed in the embodiment;

DETAILED DESCRIPTION

Various embodiments according to the invention will be described hereinafter with reference to the accompanying drawings. In general, according to one embodiment of the invention, there is to provide a disk drive in which servo-write management information is recorded in a disk medium, together with servo data, without increasing the number of servo data.

(Disk Drive and Configuration of the Servo Track Writer)

Figure 11:
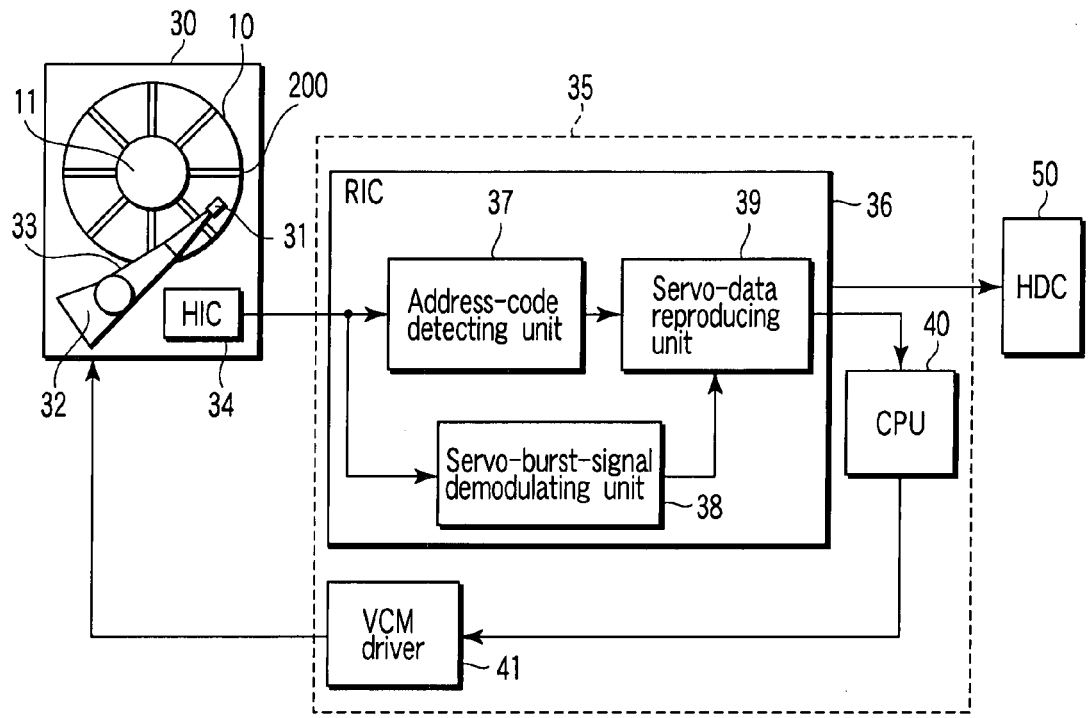
FIG. 11 is a block diagram showing the major components of a disk drive according to the embodiment.

FIG. 1 is a block diagram showing the major components of a servo-track writer (STW) according to an embodiment of this invention. FIG. 11 is a block diagram showing the major components of a disk drive according to the embodiment.

The servo-track writer (STW) is an apparatus specially designed to write servo data (also called servo pattern or servo information) on a disk medium 10 incorporated in the disk drive. As FIG. 1 shows, the servo-track writer has a servo head 12. The servo head 12 writes servo data on the disk medium 10 attached to the spindle motor (SPM) 11.

The servo-track writer has a head drive mechanism 13, a write control circuit 14, a clock head 15, a master clock circuit 16, and a controller 17. The head drive mechanism 13 holds the servo head 12 and moves the servo head 12 to a desired position over the disk medium 10.

The controller 17 is a main control device (composed mainly of a microprocessor and memories) that controls the head drive mechanism 13, write control circuit 14 and master clock circuit 16. The controller 17 controls the head drive mechanism 13, controlling the positioning of the servo head 12. The head drive mechanism 13 comprises an actuator. The actuator holds the servo head 12 and is driven by a voice coil motor.

When controlled by the controller 17, the write control circuit 14 supplies servo data to the servo head 12. The write control circuit 14 supplies a servo burst signal to the servo head 12, along with the servo data, as will be described later. Note that the servo burst signal contains servo-write management information. The servo head 12 writes the servo burst signal containing the servo data and the servo-write management information, at a designated position on the disk medium 10.

When controlled by the controller 17, the master clock circuit 16 supplies a clock signal to the clock head 15. The clock signal is previously written on the outermost region of the disk medium 10, before servo-writing process. The controller 17 refers to the clock signal, as a timing signal.

The servo-track writer writes servo data items 200 on the disk medium 10 for servo sectors, respectively. Each servo data 200 is written in such a format as shown in FIG. 2. As shown in FIG. 11, the servo sectors are a recording area. After the servo data items 200 have been recorded on the disk medium 10, the servo sectors, each extending in a radial direction, are spaced apart and arranged in the circumferential direction of the disk medium 10.

Each servo data item 200 contains a servo AGC signal 20, an address mark 21, servo address data 22, servo burst signals (A, B, C and D) 23, and a gap 24. The main components of the servo data 200 are the servo address data 22 and the servo burst signals 23.

The servo address data 22 is address-code information that contains two address codes. One address code (cylinder code) identifies a track (cylinder). The other address code (sector number) identifies a sector. The servo burst signals (servo burst pattern) 23 are burst signals A to D, which are usually out of phase.

In the present embodiment, the 0 or 180 degrees out of phase pattern of the burst signals 23, i.e., signals A to D, defines a two-bit code (binary data). Thus, such servo-write management information as will be described later is recorded as if buried in a servo sector.

(Servo-Write Operation)

The servo-write operation that is performed in this embodiment will be explained, with reference to FIGS. 3 and 4.

Figure 3:
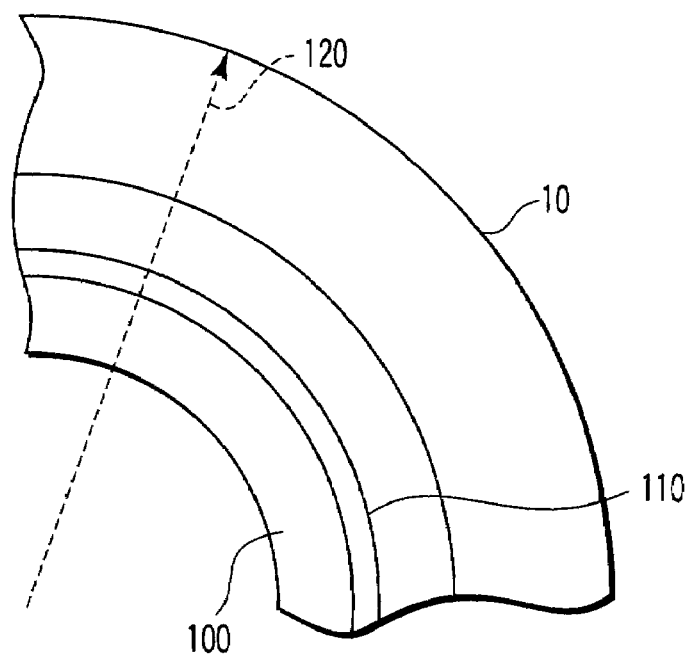
FIG. 3 is a diagram explaining a servo-writing method according to the embodiment.
Figure 4:
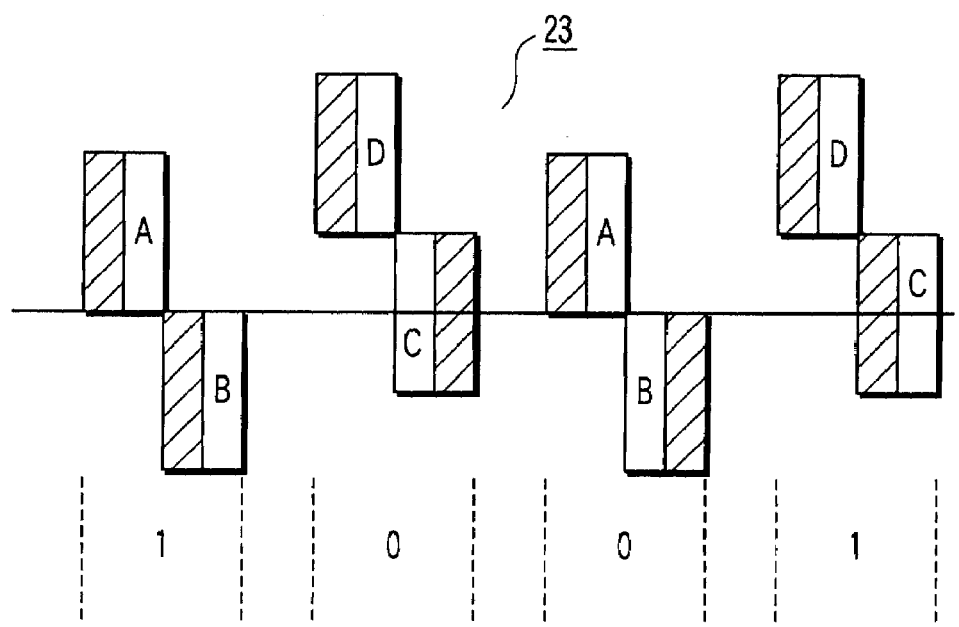
FIG. 4 is a diagram explaining the format in which servo-write management information is written in the embodiment.

In the present embodiment, the servo head 12 of the servo-track writer writes each servo data 200 as it is moved from the innermost region of the disk medium 10 to the outermost region thereof as is shown in FIG. 3. The regions in which the servo data items 200 are written divide the disk surface into a plurality of regions 100. A servo-write management information item for each region 100 is written in the track 110 (cylinder) that lies immediately outside the region 100.

The region 100 in which the servo data item 200 is recorded is a region for, for example, hundreds of tracks. The track 110, in which the servo-write management information item is recorded, is a region for, for example, some tracks. The servo-write management information contains the data representing those parts of the medium 10, where errors have occurred in writing servo data 200 and the defect data representing those parts of the medium 10, which may be used in place of those parts where the errors have occurred. The servo-track writer generates the management information.

In this embodiment, the servo-track writer converts the servo-write management information for each region 100 to binary data (i.e., a code consisting of 0s and 1s), immediately after it has generated the information. The servo-track writer writes the 0s or is of the binary data in the form of 0 or 180 degrees out of phase pattern of the servo burst signals (A to D) 23, immediately after it has finished writing the servo data 200 in each region.

In other words, the servo-track writer writes the servo-write management information on the disk medium 10 in the servo sector, as if buried in the servo burst signals (A to D) 23. In this case, a plurality of tracks are allocated to the track 110 in which the servo-write management information is recorded, so that the servo data may be reproduced with high reliability. For example, several tracks are allocated to the track 110. Further, the servo-track writer writes the same servo-write management information repeatedly.

The servo-write management information is binary data consisting of 1s and 0s and recorded in the form of 0 or 180 degrees out of phase pattern of the servo burst signals (A to D) 23. More precisely, the information is the phases of a signal formed by combining the burst signals A, B, C and D. In the binary data, as shown in FIG. 4, "1" will be determined if the signals obtained by combining burst signals A and B and combining burst signals C and D are of the same sign (in phase), and "0" will be determined if these signals are of the different signs (out of phase).

(Recorded State of the Servo-Write Management Information)

The relation that the amplitudes of servo-burst signals have with signs in a track in which the servo-write management information is to be written will be described, with reference to FIGS. 5A and 5B, FIGS. 6A and 6B, FIGS. 7 and 8, FIGS. 9A and 9B, and FIGS. 10A and 10B.

Figures 5A, 5B:
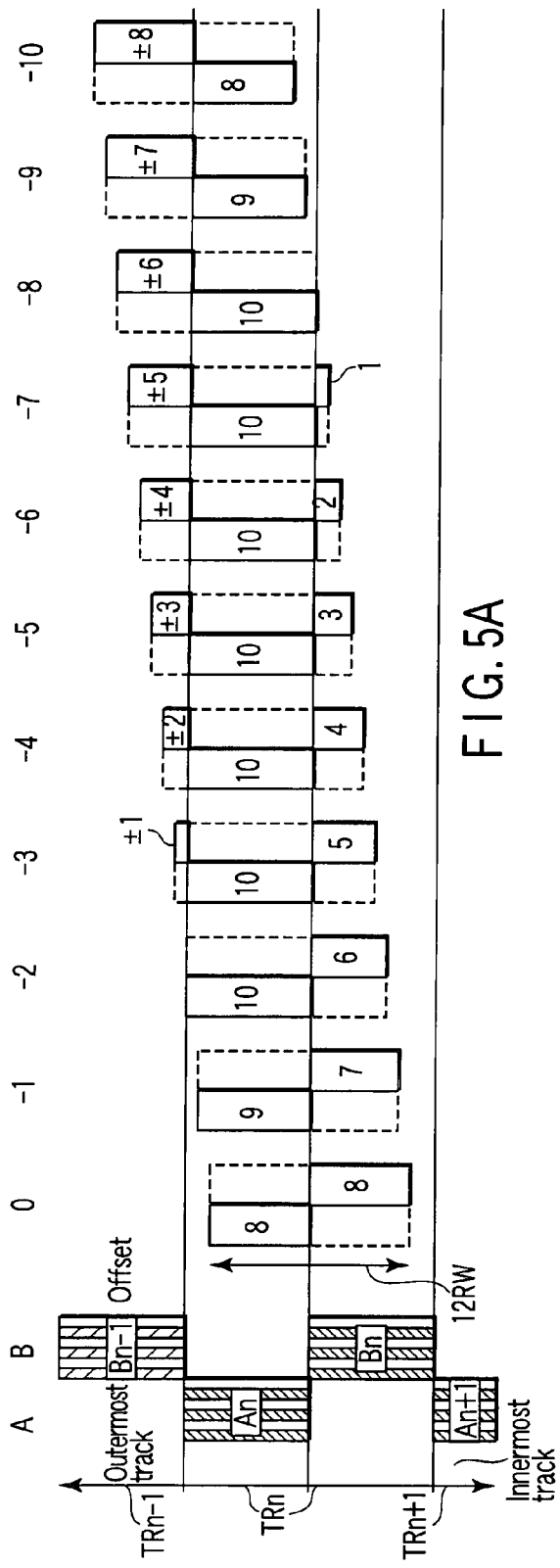
FIGS. 5A and 5B are diagrams explaining a relation that the amplitudes of servo burst signals have with signs in the servo-write management information according to the embodiment.

FIG. 5A shows the output that the head (i.e., read head having a head width 16RW) generates from an offset change on the servo track TRn when the servo burst signals A and B are in phase, in the case where the servo-write management information based on the servo data 200 written on the disk medium 10 will be written in that servo track TRn. FIG. 5A also shows the output that the head generates from a servo burst signal Bn−1 at a servo track TRn−1 adjacent to the servo track TRn.

FIG. 5B is a diagram showing the amplitudes of the servo burst signals A and B, both output from the head. As shown in FIG. 5B, the servo burst signal B has an amplitude when servo burst signal Bn−1 is in phase with servo burst signal Bn, and has another amplitude when the servo burst signal Bn−1 is out of phase with the servo burst signal Bn. As seen from FIG. 5B, the servo burst signals A and B have values of the same sign until a ½ track offset occurs, if the servo burst signal Bn−1 in the adjacent servo track TRn−1 is in phase with the servo burst signal Bn. If the servo burst signal Bn−1 is out of phase with the servo burst signal Bn, however, it cannot be guaranteed that the servo burst signals A and B will have values of the same sign.

Hence, in writing the servo-write management information in the servo track TRn, the servo burst signals An+1 and Bn−1 in the servo sectors adjacent in the radial direction must be in phase with the servo burst signals An and Bn, respectively, in order to obtain binary data bit "1" from the servo burst signals An and Bn that are in phase in a servo sector of the servo track TRn.

Figures 6A, 6B:
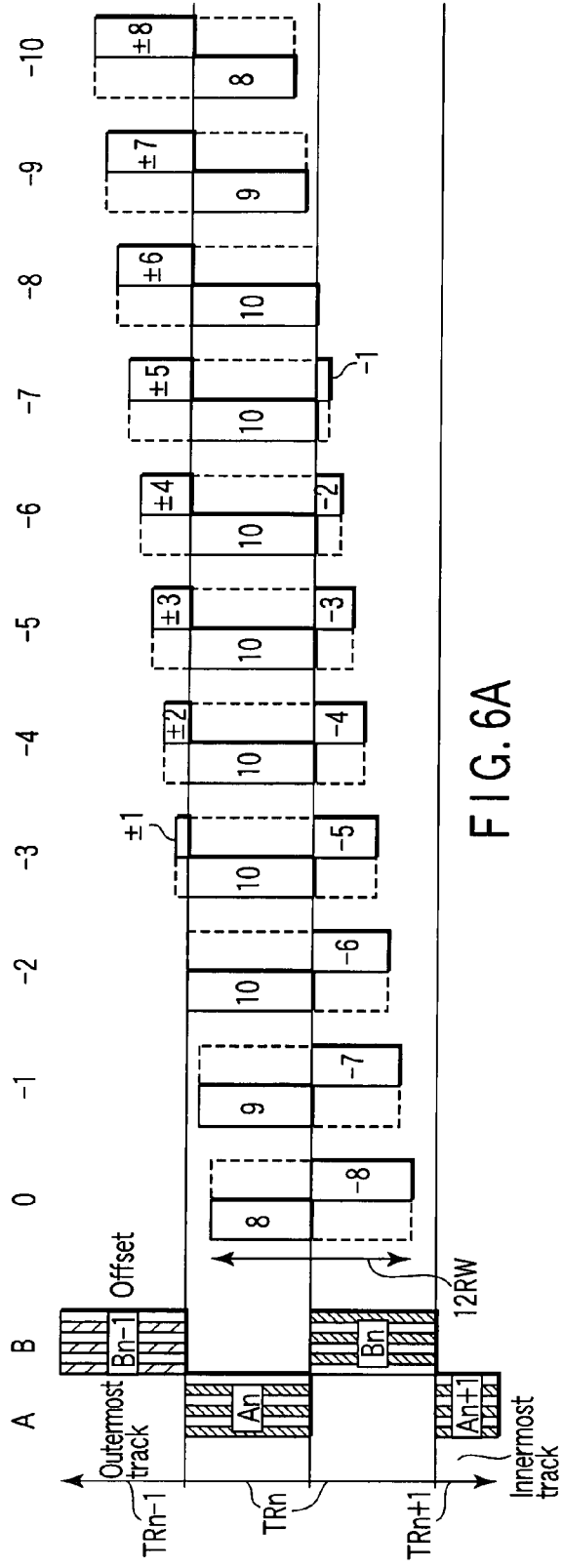
FIGS. 6A and 6B are diagrams explaining another relation that the amplitudes of servo burst signals have with signs in the servo-write management information according to the embodiment.

FIG. 6A shows the output that the head (i.e., read head having the head width 16RW) generates from an offset change on the servo track TRn when the servo burst signals A and B are out of phase, in the case where the servo-write management information will be written in that servo track TRn. FIG. 6B is a diagram showing the amplitudes of the burst signals A and B, both output from the head in the case where the servo burst signals A and B are out of phase and the servo burst signals for the servo tracks TRn and TRn−1 are either in phase or out of phase.

As in the case shown in FIGS. 5A and 5B, the servo burst signals An+1 and Bn−1 of the servo sectors adjacent in the radial direction must be in phase with the servo burst signals An and Bn, respectively, in order to obtain binary data bit "0" from the servo burst signals An and Bn that are out of phase in a servo sector of the servo track TRn.

FIG. 7 is a table explaining the relation between the phases of servo burst signals A and B and bit values (i.e., 0 or 180 degrees out of phase pattern), which is used to determine whether the binary data bit is "1" or "0."

In FIG. 7, "+" and "−" are signs that indicate phases which are same or opposite to each other. If the servo burst signals A and B have same phase (or are in phase) and have the same sign, the bit will be determined to be "1." If the servo burst signals A and B have opposite phase (or are out of phase) and have different signs, the bit will be determined to be "0."

In FIG. 7, mark "*" indicates that the head is not set off to the servo sector and assumes a given state, and mark "?" indicates that the phase relation between the servo burst signals A and B have an indefinite phase relation due to the offset and the value (1 or 0) of the bit depends on the offset.

Figures 9A, 9B:
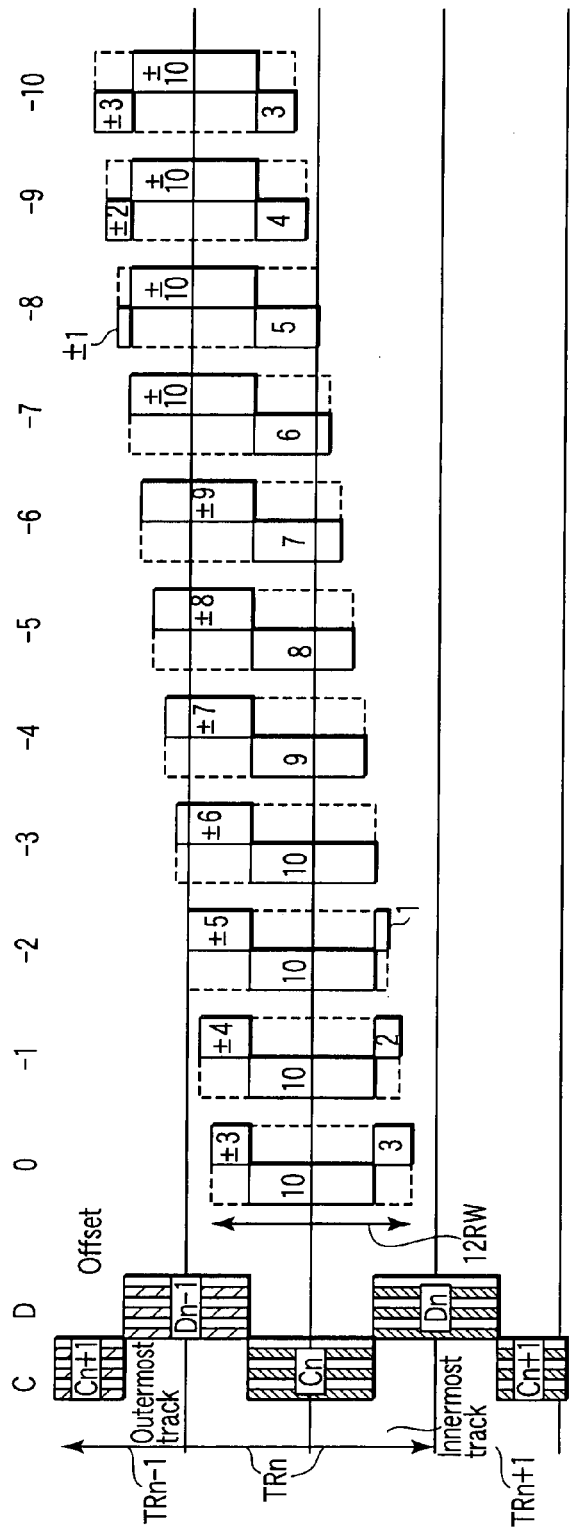
FIGS. 9A and 9B are diagrams explaining the relation that the amplitudes of servo burst signals have with signs in the servo-write management information according to the embodiment.

FIG. 9A shows the output the that the head (i.e., read head having the head width 16RW) generates from an offset change on the servo track TRn when the servo burst signals Cn and Dn are in phase, in the case where the servo-write management information will be written in that servo track TRn. FIG. 9B is a diagram showing the amplitudes of the burst signals C and D, both output in the case where the servo burst signals Cn and Dn are in phase and the servo burst signal Dn−1 is either in phase or out of phase.

FIG. 9B is a diagram showing the amplitudes of the burst signals D and D output from the head when the servo burst signals Cn and Cn are in phase and the servo burst signal Dn−1 is either in phase or out of phase.

As seen from FIG. 9B, the servo burst signals C and D have values of the same sign if the servo burst signal Dn−1 is in phase with the signal Dn in the servo track TRn in which the servo-write management information will be written. If the servo burst signal Dn−1 is out of phase with the servo burst signal Dn, however, the servo burst signals C and D have values of different signs, with no exception.

Thus, in writing the servo-write management information in the servo track TRn, the servo burst signal Dn−1 in a servo sector adjacent in the radial direction must be in phase with the servo burst signal Dn in order to obtain binary data bit "1" from the servo burst signals Cn and Dn that are in phase in a servo sector of the servo track TRn. Similarly, in the servo track TRn+1, the servo burst signal Cn+1 in a servo sector adjacent in the radial direction must be in phase with the servo burst signal Cn in order to obtain binary data bit "1" from the servo burst signals Cn and Dn that are in phase in a certain sector.

Figures 10A, 10B:
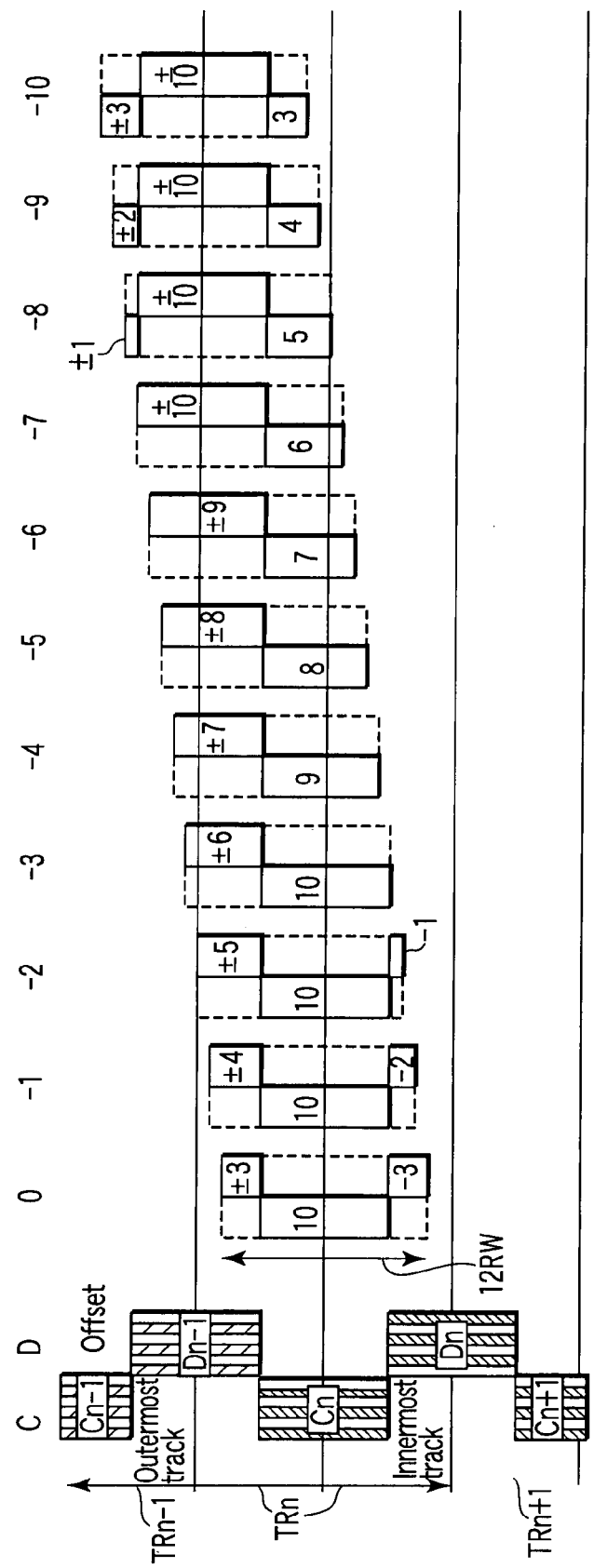
FIGS. 10A and 10B are diagrams explaining another relation that the amplitudes of servo burst signals have with signs in the servo-write management information according to the embodiment.

FIG. 10A shows the output the that the head (i.e., read head having the head width 16RW) generates from an offset change on the servo track TRn when the servo burst signals Cn and Dn are in out of phase, in the case where the servo-write management information will be written in that servo track TRn.

FIG. 10B is a diagram showing the amplitudes of the burst signals C and D, both output in the case where the servo burst signals Cn and Dn are out of phase and the servo burst signal Dn−1 is either in phase or out of phase.

As seen from FIG. 10B, the servo burst signals C and D have values of the different signs if the servo burst signal Dn−1 is in phase with the signal Dn in the servo track TRn in which the servo-write management information will be written. If the servo burst signal Dn−1 is out of phase with the servo burst signal Dn, however, the servo burst signals C and D have values of the same sign, with no exception.

Thus, in writing the servo-write management information in the servo track TRn, the servo burst signal Dn−1 in a servo sector adjacent in the radial direction must be in phase with the servo burst signal Dn in order to obtain binary data bit "0" from the servo burst signals Cn and Dn that are out of phase in a servo sector adjacent in the radial direction. Similarly, in the servo track TRn+1, the servo burst signal Cn+1 in the servo sector adjacent in the radial direction must be in phase with the servo burst signal Cn in order to obtain binary data bit "1" from the servo burst signals Cn and Dn that are out of phase in a certain sector.

FIG. 8 is a table explaining the relation between the phases of servo burst signals C and D and bit values (i.e., 0 or 180 degrees out of phase pattern), which is used to determine whether the binary data bit is "1" or "0." As in FIG. 7, "+" and "−" are signs that indicate phases which are opposite to each other. If the servo burst signals C and D have same phase and have the same sign, the bit will be determined to be "1." If the servo burst signals C and D have opposite phase and have different signs, the bit will be determined to be "0."

In FIG. 8, mark "*" indicates that the head is not set off to the servo sector and assumes a given state, and mark "?" indicates that the phase relation between the servo burst signals C and D have an indefinite phase relation due to the offset and the value (1 or 0) of the bit depends on the offset.

In summary, in writing the servo-write management information in the servo track TRn, any servo sectors in adjacent tracks and lying adjacent in the radial direction must have the same phase pattern as the servo sector of the track, in which to write the servo-write management information, in order to acquired binary data bit from the servo sector of that track, not influenced by the offset. In view of this, the region in which the servo-write management information will be written should be composed of, for example, at least three tracks (cylinders).

The disk medium 10 may have 128 servo sectors per track. In this case, the servo burst signals A and B in combination provide a one-bit data item, and the servo burst signals C and D in combination provide a one-bit data item. Thus, two bits of data can be stored by recording the servo burst signals A, B, C and D. Therefore, binary data of at most 256 bits can be stored as servo data.

(Servo Data and Reproduction of the Servo-Write Management Information)

FIG. 11 is a block diagram showing the major components of a disk drive 30, i.e., a product according to the present embodiment.

The disk drive 30 has a disk medium 10, a spindle motor 11, an actuator 33, a head amplifier (head IC) 34, a printed circuit board (PCB) 35 and a disk controller (HDC) 50. The disk medium 10 stores the servo data 200 that the STW has written in the servo-writing step described above.

The spindle motor 11 rotates the disk medium 10 at highs speed. In the present embodiment, the servo data 200 written in a servo sector of the disk medium 10 contains servo-write management information that is binary data. The information is recorded in the form of an opposite-phase pattern of servo burst signals A to D.

Driven by a voice coil motor (VCM) 32, the actuator 33 moves a head 31 in the radial direction of the disk medium 10. The voice coil motor 32 is driven and controlled by a VCM driver 41 mounted on the PCB 35.

The head 31 has a read head and a write head. The read head reads the servo data, the servo-write management information and user data. The write head writes the user data in data area other than the servo sectors. The head amplifier 34 amplifies a read signal output from the read head. The read signal amplified is output to a read channel (read IC) 36.

On the PCB 35 there are mounted the VCM driver 41, the read channel 36, and a microprocessor (CPU) 40. The CPU 40 constitutes a position control unit. As the CPU 40 performs position control, the VCM driver 41 drives and controls the voice coil motor 32. The CPU 40 uses the servo data reproduced by a servo-data reproducing unit 39 and controls the position of the head 31. The reproducing unit 39 will be described later.

The HDC 50 can function as an interface between the disk drive and a host system to transfer data. Under the control of the CPU 40, the HDC 50 transfers the user data output from the read channel 36. The HDC 50 receives the user data from the host system and transfers it to a write channel (write-data processing circuit, not shown), so that the user data may be written on the disk medium 10.

The read channel 36 is a circuit for processing read signals. It processes the servo data signals, along with the user data signals. A servo-data processing circuit is provided, which includes an address-code detecting unit 37, a servo-burst-signal demodulating unit 38, and the servo-data reproducing unit 39.

The address-code detecting unit 37 receives a read signal from the head amplifier 34 and detects, from the read signal, a servo-data signal that corresponds to the servo address data 22 shown in FIG. 2. The servo-data signal detected is output to the servo-data reproducing unit 39. The servo-burst-signal demodulating unit 38 receives servo burst signals (A to D) 23 from the head amplifier 34 and demodulates it. The servo burst signals 23 demodulated are output to the servo-data reproducing unit 39.

The servo-data reproducing unit 39 reproduces servo address data 22 from the servo data signal detected by the address-code detecting unit 37. The servo address data 22 is output to the CPU 40. The servo-data reproducing unit 39 also reproduces position error data from the servo burst signals (A to D) 23. The position error data, which represents the position error of the head 31, is output to the CPU 40. The CPU 40 uses the reproduced servo data, i.e., the servo address data and the position error data, controlling the positioning of the head 31 as described above.

Figure 12:
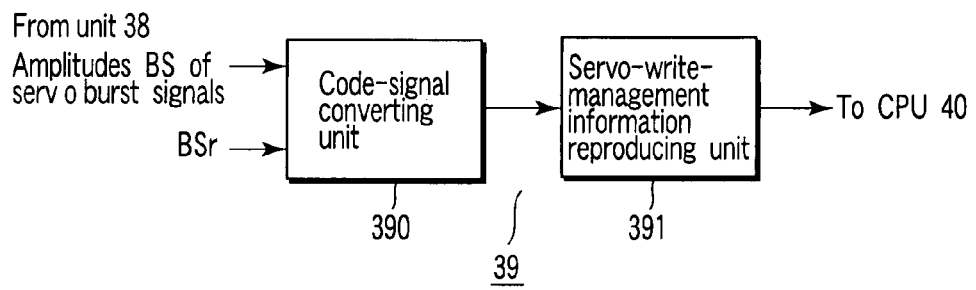
FIG. 12 is a diagram showing in detail the configuration of the servo-data reproducing unit according to the embodiment.

As shown in FIG. 12, the servo-data reproducing unit 39 used in this embodiment has a code-signal converting unit 390 and a servo-write-management information reproducing unit 391. The code-signal converting unit 390 receives the data representing the amplitudes BS of the servo burst signals (A to D) 23 and the data representing the phases BSr of the burst signals A to D, from the servo-burst-signal demodulating unit 38. The unit 390 converts the amplitudes BS and the phases BSr to binary data (code signals) consisting of 1s or 0s, as described above. In most cases, the servo-burst-signal demodulating unit 38 has a function of detecting the phases BSr of the burst signals A to D.

The servo-write-management information reproducing unit 391 receives the code signal from the code-signal converting unit 390 and reproduces preset format information, which is output to the CPU 40. The CPU 40 decodes the format information output from the servo-write-management information reproducing unit 391, on the basis of table information already prepared.

In summary, the disk drive 30 according to this embodiment has a disk medium 10 on which servo-write management information is recorded, together with servo data, in the servo-write process. The servo-write management information is recorded in one unit of servo sectors, in the form of binary data that corresponds to the opposite-phase pattern of servo burst signals (A to D) 23. The servo-write management information is recorded as if buried in the servo data. Thus, the servo sectors on the disk medium 10 need not have special storage areas for the servo-write management information. Hence, the servo-write management information can be recorded on the disk-shaped disk medium 10, along with the servo data.

The CPU 40 can reproduce the servo-write management information from the servo sectors on the disk medium 10 and transfers the information to the host system when the host system requests for the information via the HDC 50. The host system can determine the recoded state of the servo data in the servo sectors, from the servo-write management information transferred from the disk drive 30.

More specifically, the host system can inspect the servo data as follows, by using the servo-write management information. During the manufacture of the disk drive, for example, a track, if any, at which a servo-write error such as a defect may be detected in a post step such as heat-run test, may be detected without inspecting the entire medium. In this case, this track can be inspected again. This helps to shorten the time of performing the post step. In addition, the servo sectors can serve to perform a defect function of preventing undesired accesses to any defective tracks and designating tracks to be used in place of the defective tracks, after the disk drive 30 has been shipped.

Thus, the disk drive 30 according to the present embodiment records the servo-data management information buried in a unit of servo sectors of a disk medium, in the form of binary data based on the 0 or 180 degrees out of phase pattern of servo burst signals. Therefore, the servo sectors can be effectively inspected by using the servo-data management information, and a defect function can be efficiently performed to prevent undesired accesses to any defective tracks.

As has been described, the present invention can provide a disk drive in which servo-write management information is recorded in a disk medium, together with servo data.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of writing servo data for positioning a head on a disk medium in a disk drive, the method comprising:

recording, with the head, servo data in an area corresponding to a designated servo sector on the disk medium; and recording a servo-write management information in an area for recording servo burst signals contained in the servo data, in the form of binary data coded based on a combination of same phase patterns and opposite phase patterns composed of the servo burst signals, wherein servo burst signals A and B and servo burst signals C and D are recorded in the area for recording the servo burst signals, wherein the coded binary data is represented as a "1" when servo burst signals A and B have the same phase pattern or when servo burst signals C and D have the same phase pattern, and wherein the coded binary data is represented as a "0" when servo burst signals A and B have the opposite phase pattern or when servo burst signals C and D have the opposite phase pattern.

2. The method according to claim 1, wherein in the second process, the servo-write management information is recorded in a designated track includes the servo sectors in which the servo data has been recorded.

3. The method according to claim 1, wherein the servo-write management information includes data representing a write-error part of the disk medium, where a write error has occurred during the writing of the servo data, and data representing a part of the disk medium, which is used in place of the write-error part.

4. The method according to claim 1, further comprising:

acquiring the servo-write management information from the disk medium in response to a request made by a host system for inspecting the servo data; and transferring the servo-write management information to the host system.

* * * * *